J. A. HOLMGREN.
COFFEE POT.
APPLICATION FILED APR. 19, 1909.
942,558.
Patented Dec. 7, 1909.
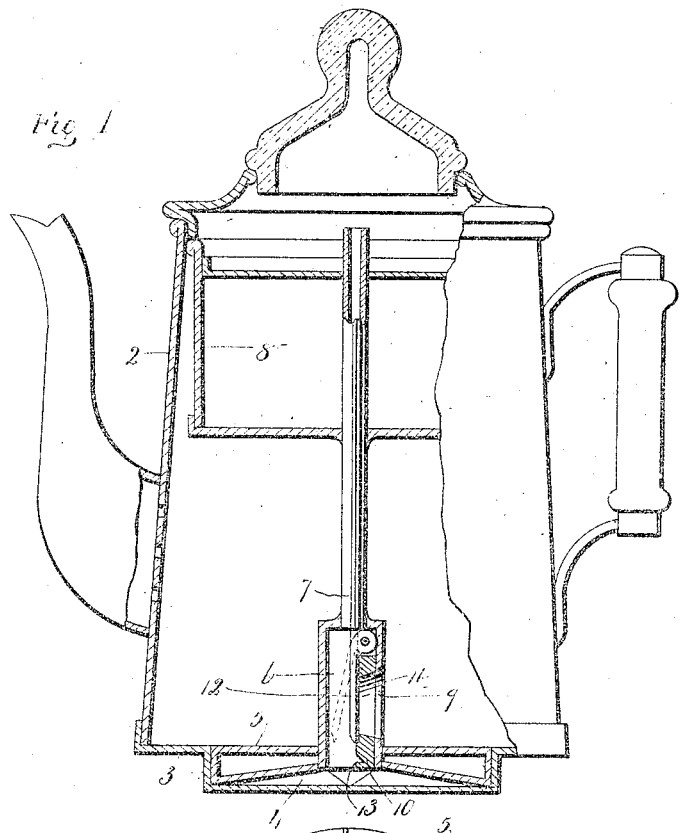
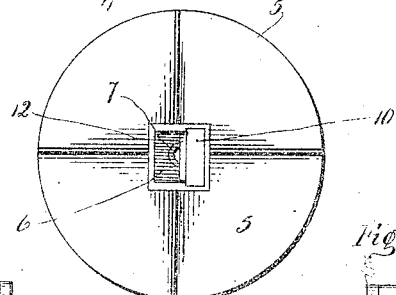
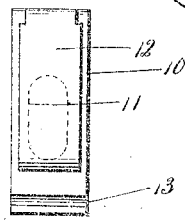 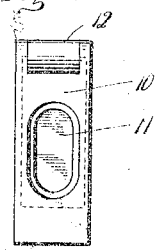
Witnesses
C. J. Reed
C. L. Reed
Inventor
John Albert Holmgren
by Seymour Earle
Atty

UNITED STATES PATENT OFFICE.

JOHN ALBERT HOLMGREN, OF NEW BRITAIN, CONNECTICUT, ASSIGNOR OF ONE-HALF TO JOSEPH EDWARD JOHNSON, OF MERIDEN, CONNECTICUT.

COFFEE-POT.

942,558.

Specification of Letters Patent.   Patented Dec. 7, 1909.

Application filed April 19, 1909.   Serial No. 490,942.

*To all whom it may concern:*

Be it known that I, JOHN ALBERT HOLMGREN, a subject of the King of Sweden, residing at New Britain, in the county of Hartford and State of Connecticut, have invented a new and useful Improvement in Coffee-Pots; and I do hereby declare the following, when taken in connection with the accompanying drawings and the numerals of reference marked thereon, to be a full, clear, and exact description of the same, and which said drawings constitute part of this specification, and represent, in—

Figure 1 a sectional view of a coffee pot constructed in accordance with my invention. Fig. 2 an underside view of the tube base removed. Fig. 3 an inside view of the valve, detached. Fig. 4 an outside view of the same.

This invention relates to an improvement in coffee pots, and particularly to those of the percolator type, the object of the invention being a simple arrangement of parts whereby a small quantity of liquid is exposed to the greatest heat so as to be quickly converted into steam; and the invention consists in a certain arrangement of valve mechanism at the bottom of the pot as will be hereinafter described and pointed out in the claims.

The pot 2 is of usual construction of coffee pots of the percolator type except that the central portion of the bottom is depressed to form a sub-base 3 which provides an auxiliary chamber 4. Adapted to be seated in this chamber is a tube-base 5 corresponding in diameter to the diameter of the chamber, and so that the upper edge of the base will be substantially flush with the bottom of the pot. The underside of this base is formed with radial grooves deeper at the center than at the circumference so as to provide a space between the central portion of the pot and the tube base. Mounted in this base is a valve chamber 6 which opens at the bottom into the chamber 4 and extending up from this valve chamber 6 is the usual steam tube 7 which discharges at its upper end into a cup-shaped vessel 8 containing the coffee as is usual in percolator coffee pots.

The valve chamber 6 is preferably made rectangular, and is larger in dimensions than the diameter of the tube 7. In one wall of this chamber is a passage or opening 9, and entered into the valve chamber is a valve block 10 having a port 11 adapted to register with the opening 9. Hinged to the upper end of the block is a valve plate 12 which by gravity will close the port 11. This block is readily slipped into the valve chamber 6 and may be provided with a notch 13 by which it may be gripped with any convenient instrument, such as a spoon or a fork, so that the block and the valve may be readily removed as required for cleaning or replacing. This valve block is entered into place before the tube base 5 is placed in position. Water from the pot will force its way through the port 11 into the chamber 4, but as this chamber is of comparatively small area, heat from the stove will readily convert the liquid into steam which escapes through the tube 7 the pressure holding the valve 12 closed. As the liquid is converted into steam the pressure to close the valve is reduced and so that more liquid from the pot may pass through the valve into the chamber. Thus a continuous circulation is secured and the liquid rapidly converted to steam. This valve block may be readily removed so that the pot can be conveniently cleaned; it is simple in construction and therefore not liable to disarrangement.

I claim:—

1. A percolator coffee pot comprising a pot having the central portion of its bottom depressed, a tube base located in said depressed portion, a valve-chamber mounted in said base and opening through it, a tube opening through the top of said chamber, an opening in one side of said chamber, and a removable valve block located in said chamber and having a port adjacent to said opening, and a valve hinged at its upper end to said block and normally closing said port.

2. A coffee pot having the central portion of its bottom depressed, a tube base located in said depressed portion and formed in its underside with radial grooves, a centrally arranged valve chamber mounted in said base and opening through it, a tube opening through the top of said chamber, an opening in one side of said chamber, a removable valve block located in said chamber and having a port adjacent to said opening, a valve hinged at its upper end to said block and normally closing said port, substantially as described.

In testimony whereof, I have signed this specification in the presence of two subscribing witnesses.

JOHN ALBERT HOLMGREN.

Witnesses:
ALFRED B. AUBREY,
H. B. CHAMBERLAIN.